United States Patent
Tsubouchi

(10) Patent No.: US 8,046,664 B2
(45) Date of Patent: Oct. 25, 2011

(54) INFORMATION PROCESSING APPARATUS AND PROGRAM FOR CONTROLLING THE SAME

(75) Inventor: Kazuo Tsubouchi, Kariya (JP)

(73) Assignee: Denso Corporation, Kariya (JP)

( * ) Notice: Subject to any disclaimer, the term of this patent is extended or adjusted under 35 U.S.C. 154(b) by 979 days.

(21) Appl. No.: 12/000,887

(22) Filed: Dec. 18, 2007

(65) Prior Publication Data
US 2008/0155209 A1 Jun. 26, 2008

(30) Foreign Application Priority Data
Dec. 20, 2006 (JP) .................. 2006-343529

(51) Int. Cl.
*G11C 29/00* (2006.01)
(52) U.S. Cl. ....................... 714/763
(58) Field of Classification Search ............ 714/718, 714/763
See application file for complete search history.

(56) References Cited

U.S. PATENT DOCUMENTS

| | | | |
|---|---|---|---|
| 5,509,120 A * | 4/1996 | Merkin et al. ............... | 726/24 |
| 6,330,715 B1 * | 12/2001 | Razzaghe-Ashrafi ........ | 717/171 |
| 6,490,722 B1 * | 12/2002 | Barton et al. ............... | 717/174 |
| 6,715,067 B1 * | 3/2004 | Rhoads et al. ............... | 713/1 |
| 6,728,713 B1 * | 4/2004 | Beach et al. ................. | 1/1 |
| 6,741,978 B1 * | 5/2004 | Rhoads et al. ............... | 1/1 |
| 6,757,838 B1 * | 6/2004 | Chaiken et al. .............. | 714/5.11 |
| 6,792,556 B1 * | 9/2004 | Dennis ......................... | 714/6.11 |
| 7,409,539 B2 * | 8/2008 | Arnez et al. ................. | 713/100 |
| 7,774,820 B2 * | 8/2010 | Prus et al. .................... | 725/132 |
| 2005/0144608 A1 | 6/2005 | Oyama et al. | |

FOREIGN PATENT DOCUMENTS

| | | |
|---|---|---|
| JP | A-2001-337829 | 12/2001 |
| JP | A-2003-036173 | 2/2003 |
| JP | A-2003-044284 | 2/2003 |
| JP | A-2003-131880 | 5/2003 |
| JP | A-2005-011120 | 1/2005 |

* cited by examiner

*Primary Examiner* — James C Kerveros
(74) *Attorney, Agent, or Firm* — Posz Law Group, PLC

(57) ABSTRACT

An information processing apparatus is configured to be backed up by a battery so that information in a main memory of the apparatus can be retained when a power supply for the apparatus is stopped. The apparatus stores kernel information in a kernel information table at a time of an initial program loading so that the kernel information stored in the kernel information table can be delivered to a kernel for restarting a program. The program can be started by receiving the kernel information from the kernel information table without retrieving the program from a memory medium or re-generating the kernel information. The apparatus with an operating system that has a relocation function for use in a vehicle can thus have a reduced system startup time.

11 Claims, 3 Drawing Sheets

FIG. 3

| PARAM/STRUCTURE | PARAM | SIZE | DESCRIPTION |
|---|---|---|---|
| module | | | module STRUCTURE |
| | pathname | 65 BYTE | PATH TO "module" |
| | entry | 4 BYTE | HEAD PHYSICAL ADDRESS OF "module" LOADED MEMORY |
| | text_paddr | 4 BYTE | HEAD PHYSICAL ADDRESS OF CODE AREA |
| | text_crc32 | 4 BYTE | CRC VALUE OF CODE AREA |
| | data_cache | 4 BYTE | HEAD PHYSICAL ADDRESS OF DATA AREA |
| | data_cache_crc32 | 4 BYTE | CRC VALUE OF DATA AREA |
| crc32 | | 4 BYTE | CRC VALUE OF "module" STRUCTURE |

INFORMATION PROCESSING APPARATUS AND PROGRAM FOR CONTROLLING THE SAME

CROSS REFERENCE TO RELATED APPLICATION

This application is based on and claims the benefit of priority of Japanese Patent Application No. 2006-343529 filed on Dec. 20, 2006, the disclosure of which is incorporated herein by reference.

FIELD OF THE DISCLOSURE

The present disclosure generally relates to an information processing apparatus for use in a vehicle.

BACKGROUND INFORMATION

In recent years, various techniques for reducing a system start time are introduced. That is, for example, contents of a memory (e.g., a random access memory: RAM) retained (e.g., is backed up) with only a CPU stalled for quickly restarting the CPU as required (so-called "resuming"), and memory contents stored as it is in a hard disk drive (HDD) is expanded into the memory for quickly returning to an operation (so-called "hibernation") are among those techniques.

However, a driver capable of handing the above function has to be developed for realizing an operation scheme described above. Further, the program in a course of an execution operation is resumed at a point of stand-by condition, with other hardware such as a network controller and the like being initialized by following a usual operation. Therefore, a process with operation sequences conducting communication with other devices through a in-vehicle local area network (vehicle LAN) or the like may encounter a problem in a course of returning to the operation due to inconsistency of the operation sequences. Thus, known techniques for quickly returning to an operation such as resuming and hibernation is difficult to be implemented to an in-vehicle system, thereby necessitating a development of high-speed startup technique having another technical point of view.

The technique disclosed in Japanese patent document JP-A-2003-131880 describes an information processing apparatus having a flash memory for storing a program including an operating system (OS) and a RAM. The apparatus checks for the RAM regarding a load completion of the program when the apparatus is started, and also checks for a normal startup of the program on the RAM. When the normal startup is detected, the program is then executed. In this manner, the program loading from the flash memory is saved at the time of system startup, thereby enabling a reduction of the startup time.

When the operating systems such as Linux, Windows® utilizing a memory management unit (MMU) function are considered for example, these programs have a program load address determined by a kernel (so-called "relocation"). Therefore, when software such as application programs or driver programs is started, the kernel is required to determine a memory address to be used by those programs every time those programs are loaded. Therefore, the MMU function OS's are bound to have longer system startup time relative to the conventional OS's having a fixed-address method.

When the in-vehicle system utilizes the technique disclosed in the above Japanese patent document, the program loading is saved. However, when the OS has the MMU function, kernel information is required for the program execution (i.e., start up of the program). For example, the OS's such as Linux, Windows, T-Kernel and the like that assumes information loading from a file generates the kernel information when loading programs, thereby making it impossible to load programs without having the kernel information, that is, without information loading controlled by the kernel. In other words, a program that re-generates the kernel information in some way is required for startup.

SUMMARY OF THE DISCLOSURE

In view of the above and other problems, the present disclosure provides a technique that enables a reduction of system startup time having a delay due to a relocation function when an operating system having the relocation function is applied to an in-vehicle system.

The information processing apparatus includes: a memory that continues to store information without power supply; a storage unit that stores a program; and a control unit that controls expansion and execution of the program in the memory at a location with an address determined by a function of an operating system. The control unit controls the memory to store, as kernel information in the memory, program identification information for identifying the program and address information for identifying an expansion area of the program when the program is retrieved from the storage unit and expanded in the memory. Then, the control unit determines whether the program is expanded in the memory with reference to the kernel information stored in the memory when the program is required to be executed after initialization of the control unit, and the control unit executes the program expanded in the memory by utilizing the kernel information without retrieving the program from the storage unit when the program is determined to be expanded in the memory.

The memory that continues to store information indicates a memory such as a flash memory made of a non-volatile memory or a memory that is backed up by a battery. Further, an "initialization" indicates a process that is executed for performing an initialization of the contents of registers or the like in a control unit at a time of beginning of power supply or at a time of resetting.

In the above-described manner, the re-retrieval of the program from the storage unit can be avoided, thereby enabling a reduction of re-generation of the kernel information. Therefore, when the operating system having the relocation function is executed by the information processing apparatus, the startup time of a program, such as a navigation program, is reduced. Further, when the information processing apparatus having the above-described operation scheme is used in an in-vehicle system, the effect of startup time reduction amounts to an un-ignorable volume in proportion to a startup frequency of the information processing system.

The part of the function of the control unit may be implemented as a control program. The control program is different from an operating system of well-known type. However, the control program may be performed as a part of the operating system. The control program executed by a CPU in the information processing apparatus serves as the information processing apparatus described above in terms of the function and the effect. Further, the program can be transferred through the network, thereby making it easier for the information processing apparatus to have an improvement of its function in comparison to an improvement of a physical part.

BRIEF DESCRIPTION OF THE DRAWINGS

Other objects, features and advantages of the present invention will become more apparent from the following detailed description made with reference to the accompanying drawings, in which:

FIG. 3 shows a diagram of data structure of kernel information.

DETAILED DESCRIPTION

Figure 1:
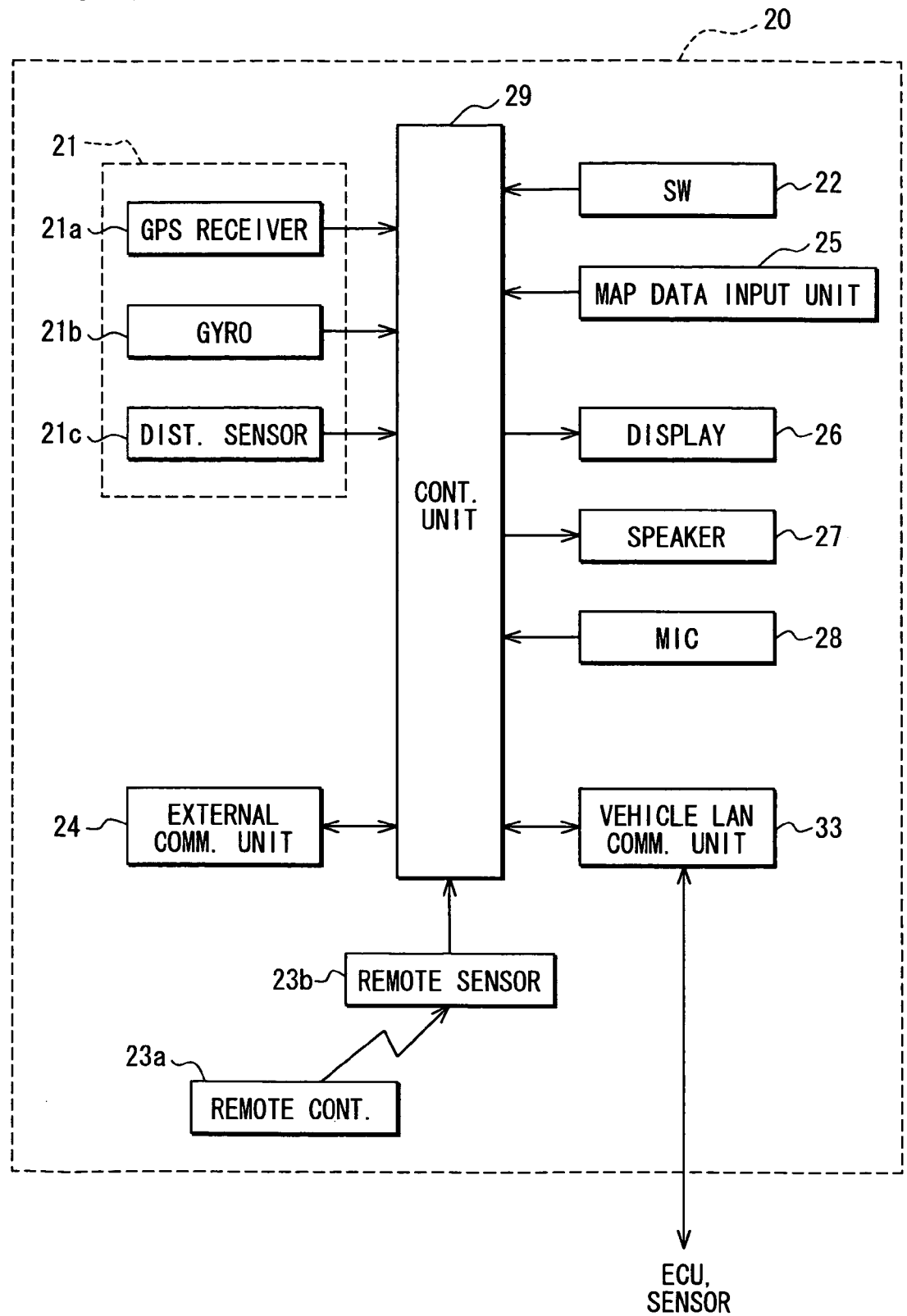
FIG. 1 shows a block diagram of a navigation apparatus in an embodiment of the present invention.

The embodiment which present invention is applied to is described with reference to the drawing. In addition, it is to be noted that the present invention needs not be limited to the forms of the following embodiment at all, but can take various forms as far as it pertains to the technical field of the present invention.

FIG. 1 is a block diagram showing outline configuration of a navigation apparatus 20 having the function of the information processing apparatus of the present invention.

The navigation apparatus 20 installed on a vehicle has a position sensor 21 detecting the current position of the vehicle, an operation switch group 22 for an input of various instructions from a user, a remote control terminal (a remote controller in the following) 23a, a remote controller sensor 23b for an input from the remote controller 23a, an external communication unit 24 for communication with a packet communication network or the like, a map data input unit 25 for an input of data from map storage medium that stores map data, sound data and the like, a display unit 26 to display maps and various information, a sound output unit (a speaker) 27 to output various guide sound and the like, a microphone 28 outputting an electrical signal based on the sound of the user's voice, a vehicle LAN communication unit 33 communicating with various ECUs and the like on a vehicle LAN, and a control unit 29 that performs various processing according to inputs from the position sensor 21, the operation switch group 22, the remote controller sensor 23b, the communication unit 24, the map data input unit 25, the microphone 28 and the vehicle LAN communication unit 33, and controls the communication unit 24, the display unit 26, the speaker 27 and the vehicle LAN communication unit 33.

The position sensor 21 includes a GPS (Global Positioning System) receiver 21a for receiving a signal from GPS satellites through a GPS antenna (not shown), a gyroscope 21b detecting the size of rotary motion applied to the vehicle and a range sensor 21c detecting a travel distance based on an acceleration and the like in a front-rear direction of the vehicle. These sensors 21a-21c respectively output signals, and the control unit 29 calculates, based on an output signal from the sensors 21a-21c, the position, the travel direction, and the speed of the vehicle. In addition, among various methods of current position detection, either the relative positioning method or the point positioning method may be employed for current position detection based on the output signal from the GPS receiver 21a.

The operation switch group 22 consists of a touch panel integrally formed on a surface of the display unit 26 and mechanical key switches which are disposed around the display unit 26 and the like. In addition, the touch panel and the display unit 26 are integrated in a layered manner, and any of the various input detection methods such as a pressure sensing method, an electromagnetic induction method, a capacitance method or combinations of these methods may be employed for detecting inputs from the touch panel.

The remote controller 23a consists of plural buttons, and signals according to pressed buttons is transmitted to the remote controller sensor 23b through the short distance wireless communication such as infrared rays.

The remote controller sensor 23b receives a signal from the remote controller 23a, and a received signal is output to the control unit 29. The external communication unit 24 acquires accident information, traffic congestion information and the like from an information center of VICS (Vehicle Information and Communication System in Japan) through a light beacon or an electric wave beacon installed on the roadside.

The map data input unit 25 is an input device for the map data and the program that are memorized on various storage medium (e.g., a hard disk, a DVD-ROM or the like, not shown in the drawing). On the map data storage medium, map data (node data, link data, cost data, background data, road data, name data, mark data, crossing data, facility data), as well as audio data for guidance, sound recognition data, various programs are memorized. In addition, instead of inputting the data and the program from the storage medium, the data and the program may be input through a communication network.

The display unit 26 has the liquid crystal display, the organic electroluminescence display or the like as the display panel, and is capable of displaying, on the display screen, a mark of the present location identified by the map data from the map data input unit 25 as well as the current position of the vehicle detected by the position sensor 21, a navigation course to the destination, a place name, a landmark, various facility icons and the like in a superposing manner. In addition, the guides of the facility and the like can also be displayed.

The microphone 28 outputs an electrical signal (a voice signal) to the control unit 29 based on an input (utterance) of a voice of the user. The user can operate the navigation apparatus 20 by inputting various sounds into the microphone 28.

The vehicle LAN communication unit 33 provides communication to various ECUs (engine ECU, AT-ECU, brake ECU) and various sensors (a blinker sensor, a door opening and shutting sensor and the like) on the vehicle LAN.

The control unit 29 mainly consists of a well-known microcomputer having a CPU, ROM, RAM, I/O and a bus line for connecting these parts, and performs various processing mainly with the CPU based on a program read from the medium such as ROM or the map data storage medium stated above. For example, the current position of the vehicle is calculated based on each of the detecting signals from the position sensor 21 as a combination of coordinates and a progress direction, and a present location display process to display maps of current position neighborhood read through the map data input unit 25 on the display unit 26, a course calculation process which calculates an optimum course from the current position to a destination based on the map data stored in the map data input unit 25 as well as the destination specified according to the operation on the operation switch group 22 and/or the wireless remote controller 23a, a route guidance process which guides the calculated course by displaying the course on the display unit 26 and/or by outputting the guide sound from the speaker 27 and the like are performed.

In addition, the contents of the main memory (i.e., the RAM in the control unit 29) is maintained even if the power supply to the navigation apparatus 20 is shut, due to a back up of electricity by the battery (not illustrated). In addition, the control unit 29 executes an operating system (OS) having MMU (Memory Management Unit) function, and each of the various processing is carried out on the OS. In addition, the present OS is the OS that does not release memory areas (an area allocated to expand program code and an area allocated to expand data for execution of the program) on the main memory (RAM) used by the program after execution of the program, with the area preserved as long as possible.

A program load process performed by the control unit 29 is, among other processes, described next with reference to a flowchart in FIG. 2. In addition, description about well-known processes such as the present location display process, the route guidance process performed by the control unit of a general navigation apparatus is omitted.

The program load process that the control unit 29 carries out is started when an execution instruction is provided by other programs including the program to control user interface. When the control unit 29 starts execution of the program load process, at first the information of the program (referred to as "target program to be started" in the following) to be loaded is acquired (S110). The acquisition of the program information is to acquire a file name, directory name from the program that has issued the execution instruction.

The control unit 29 determines successively whether the program to be loaded is started for the first time (S115). More practically, a kernel information table in the main memory (RAM) is referred to, and whether there is the kernel information about the target program is determined. When no kernel information is determined to be existing (S115:YES) (in other words, starting the program for the first time), the process proceeds to S120. When the kernel information about the target program is determined to be existing (S115:NO) (in other words, the program has been started beforehand), the process proceeds to S150. In addition, it is mentioned later for more details about the kernel information. Further, the kernel information table is the table which can store the kernel information, and the kernel information is constituted in a manner that each of information segments to constitute the kernel information is stored in a bundle of information segments for respective kernel information entries in the table. Furthermore, when the program codes or the like are erased from the main memory, the kernel information in correspondence to the program codes or the like is also erased from the kernel information table.

In S120 which is taken after the determination that the program is started for the first time, the target program is loaded to the main memory (RAM). The load of the program performed in the present step is the load of the program by the existing method, that is, the OS allocates an area of the main memory for the program, the program is retrieved from the map data storage medium or the ROM in the control unit 29 through the map data input unit 25 to the main memory, and the program is put in an executable condition.

The details of the kernel information is now described. The kernel information is the information to be used when the kernel controls the execution of the program, and it is the information specified for a program (a module) unit. An example of the kernel information is described with reference to a data structure diagram of FIG. 3. The kernel information in the example consists of a structure 'modue' and a parameter 'crc32' to store the CRC value of the structure 'module' itself. The structure 'modue' consists of each of the following parameters, that is, 'pathname,' 'entry,' 'text_paddr,' 'text_crc32,' 'data_cache,' and 'data_cache_crc32.' The parameter 'pathname' is a parameter to store the path name of the structure 'module.' The parameter 'entry' is a parameter to store a top physical address of the memory where the structure 'module' is loaded. The parameter 'text_paddr' is a parameter to store the top physical address of the program code area where the program code is stored. The parameter 'text_crc32' is a parameter to store the CRC value of the program code area. The parameter 'data_cache' is a parameter to store the top physical address of the program data area that is the area of the data which the program uses for its execution. In addition, for example, the program data area is used as the area where a parameter with the initial value is stored. The parameter 'data_cache_crc32' is a parameter to store the CRC value of the program data area. Among the data of the above parameters, data to be set to each of the parameters 'pathname,' 'entry,' 'text_paddr,' 'data_cache,' are generated when the program is loaded to the main memory in S120.

Figure 2:
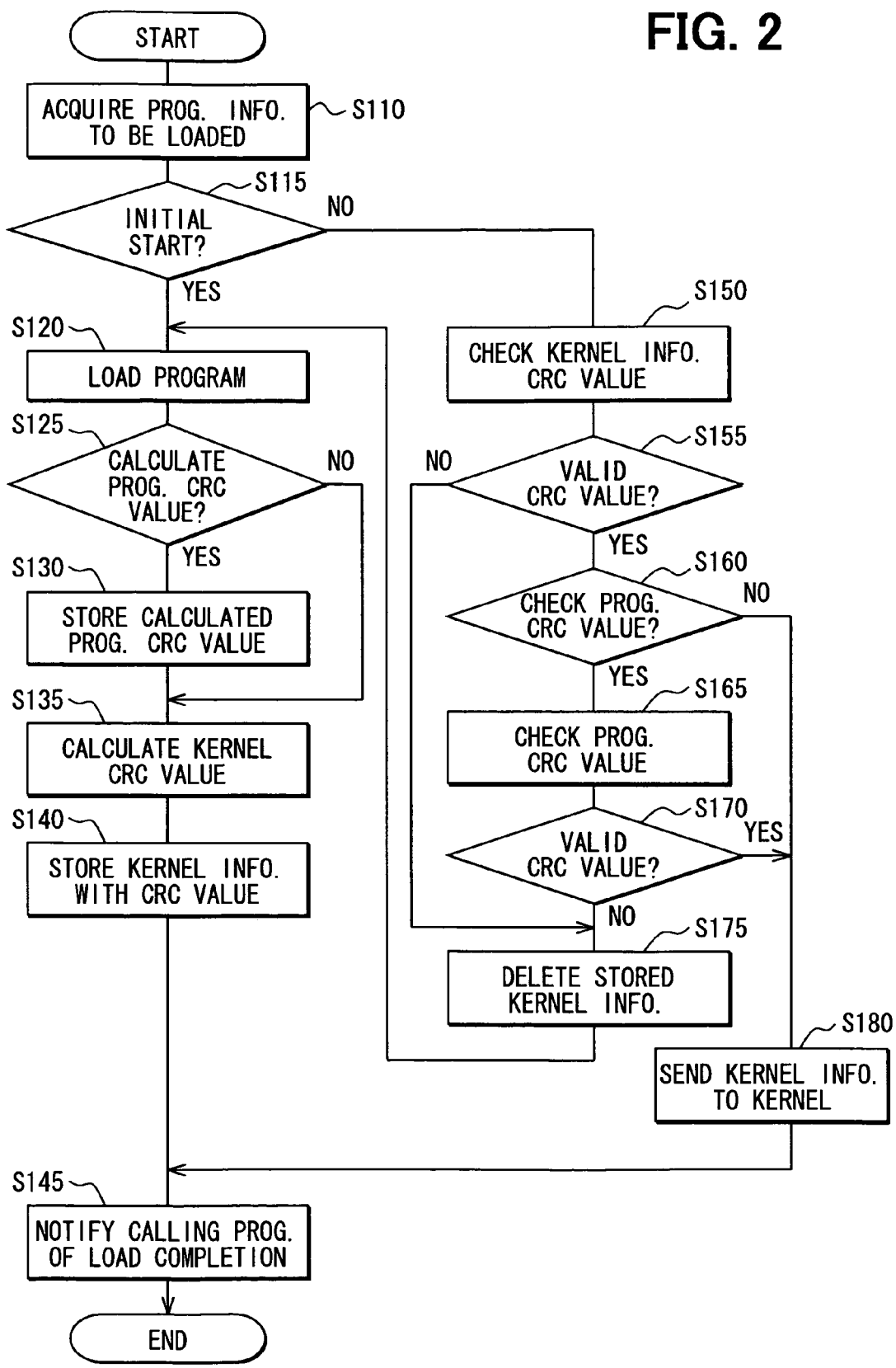
FIG. 2 shows a flowchart of a program load process in the embodiment of the present invention.

Then, back in FIG. 2, whether the CRC value of the program is calculated (S125). The CRC value of the program in this case means that the CRC value of the program code area of the target program memorized in main memory and the CRC value of the program data area that the target program uses. Those CRC values respectively corresponds to, in FIG. 3, the CRC value of the program code area to be set in 'text_crc32,' and the CRC value of the program data area to be set in 'data_cache_crc32.' The present determination is performed based on the description of a predetermined configuration file and an argument at the time of the start of the program. In addition, the calculation of the CRC value of the program assumes debugging of the program. That is, the debugger, or the debugging program, changes the program code of a stopping position (i.e., a break point) to the code that "generates an exception (for debug)" so that the program is stopped at the stopping position due to the generation of the exception. Therefore, the program is loaded every time the process comes to the stopping point (i.e., the break point) if the break point in debugging remains in the program of the present invention, because of the difference of the program code from the time when the CRC value is initially calculated. For avoiding the above-described situation, the present step of determining "whether the CRC determination is performed" is inserted (after determining the CRC value calculation in S125, whether the CRC value is checked is determined later in S160).

When calculation of the CRC value of the program is determined (S125:YES), the process proceeds to S130. When no calculation is determined to be performed (S125:NO), the process proceeds to S135.

In S130 which is taken after determination that the CRC value of the program is to be calculated, the CRC value of the program is calculated and memorized. Then, the CRC value of the kernel information (in FIG. 3, the kernel information corresponds to data of the structure 'module') is calculated (S135). When the CRC value of the kernel information is calculated, the calculated CRC value is added to the kernel information (the value is set in the parameter 'crc32' in the example of FIG. 3). Then, the kernel information having the CRC value added thereto is stored in the kernel information table in the main memory in the control unit 29 (S140), and the process proceeds to S145.

In S145, a notification is provided for the program that has issued the execution instruction of the present process (the program load process) (S145). Then, the present process (the program load process) is concluded.

On the other hand, the kernel information of the target program is identified from the kernel information table in the main memory and the CRC value of the kernel information is checked in S150 which is taken after the determination that the start of the program is not for the first time. More practically, the CRC value of the kernel information is calculated for a portion of the kernel information that excludes the CRC value of the kernel information (i.e., the portion of the structure 'module' in the example of the FIG. 3), and the calculated CRC value is compared with the CRC value that is originally added to the kernel information (i.e., in the example of the FIG. 3, the value stored in the parameter 'crc32') if they are identical with each other.

Then, the process diverges depending on the check result (S155). When the check result is affirmative (i.e., when the CRC values accord with each other) (S155:Yes), the process proceeds to S160. The process proceeds to S175 when the check result is negative (i.e., when the CRC values disagree with each other) (S155:NO).

Whether the CRC value of the program is checked is determined in S160 which is taken after the check result is affirmative. The present determination is performed based on the description of a predetermined configuration file and an argument at the time of the start of the program. In addition, the cyclic redundancy check of the program assumes debugging, and the cyclic redundancy check of the program is preferably configured not to be performed for normal cases. When it is determined that the cyclic redundancy check of the program is carried out (S160:YES), the process proceeds to S165. The process proceeds to S180 when it is determined that the cyclic redundancy check of the program is not carried out (S160: NO).

In S165 which is taken after the cyclic redundancy check of the program is carried out, the CRC value of the program is checked. In this case, "the CRC value of the program being checked" means a comparison of the CRC values being calculated as the CRC value of the program code area of the target program memorized in the main memory and as the CRC value of the program data area that is used by the program, with the respective CRC values set in the kernel information of the target program. In the example of FIG. 3, the value set in 'text_crc32' is compared with the CRC value of the program code area, and at the same time, the value set in 'data_cache_crc32' is compared with the CRC value of the program data area.

Then, the process diverges depending on a check result of the CRC value (S170). When the check result is affirmative (when the CRC values accord with each other) (S170:YES), the process proceeds to S180. The process proceeds to S175 when the check result is negative (the CRC values disagree with each other) (S170:NO).

The kernel information of the program that is stored in the kernel information table in the main memory is deleted in S175 which is taken when it is determined that the check result is negative (the CRC values disagree with each other). Then, the process returns to S120.

When it is determined that the cyclic redundancy check of the program is not carried out in S160, the kernel information identified in S150 is passed to the kernel in S180 which is taken when the check result is determined to be affirmative in S170, and the process proceeds to S145.

Because the main memory of the navigation apparatus 20 in the above embodiment is backed up by battery, information in the main memory is maintained even when the power supply for the navigation apparatus 20 is stopped. Further, the kernel information is stored in the kernel information table at the time of the first program load by a function of the program load process stated above (S140), and the stored kernel information is passed to the kernel when the program is started again (S180).

Therefore, the operating system can start the execution of the program without retrieving the program from storage medium such as the ROM in the control unit 29 or the map data storage medium again, or without re-generating the kernel information. Thus, the start-up time of the system can be shortened.

In addition, the CRC value of the kernel information is checked before passing the kernel information to the kernel in the program load process (S150). In this case, the program is configured to be re-loaded from the ROM or the map data storage medium (S120) when there is inconsistency in the CRC value (S155:NO).

Therefore, even if the kernel information is destroyed for some kind of reasons, the program is not carried out based on the destroyed kernel information. In addition, in the program load process, the top physical address of the program code area and the top physical address of the program data area in the main memory are configured to be memorized as kernel information (S140, cf. FIG. 3). Then, those information is passed to the kernel (S180). Therefore, because the operating system can grasp the top physical address of the program code area and the top physical address of the program data area immediately, it is not necessary to collect these address information separately, and the start speed of the program is improved.

Furthermore, in the program load process, the CRC value of the program code area and the CRC value of the program data area in the main memory can be checked (S165). Therefore, even if the program code or the data which the program code and the program use are destroyed for some kind of reasons, the program is not carried out based on the destroyed program codes, the data or the like.

Correspondence between the term in the above embodiment and claim language is shown in the following. The RAM of the control unit 29 is equivalent to a memory, and the ROM of the control unit 29 and the map data storage medium are equivalent to storage unit, and the CPU of the control unit 29 is equivalent to a control unit. In addition, a value stored in the parameter 'crc32' in FIG. 3 is the CRC value of the kernel information. A value stored in the parameter 'text_paddr' is the address information of the program code area where a program code is expanded. A value stored in the parameter 'text_crc32' is the CRC value of the program code area. A value stored in the parameter 'data_cache' is the address information of the program data area where data used for the execution of the program is expanded. A value stored in the parameter 'data_cache_crc32' is the CRC value of the program data area.

Although the present invention has been fully described in connection with the preferred embodiment thereof with reference to the accompanying drawings, it is to be noted that various changes and modifications will become apparent to those skilled in the art.

For example, the parameters and the values stored therein may be arbitrarily defined and associated besides the relationship defined in the above embodiment for the convenience and/or efficiency of programming or for other reasons.

The structure of the structure 'module' may be formalized in other way as long as the structure serves as storage of parameter values.

Such changes and modifications are to be understood as being within the scope of the present invention as defined by the appended claims.

What is claimed is:

1. An information processing apparatus as a navigation device, comprising:
 a memory that stores information;
 a storage unit that stores a program; and a control unit that controls expansion and execution of the program in the memory at a location with an address determined by a function of an operating system, wherein the control unit controls the memory to store, kernel information in the memory, the kernel information including program identification information for identifying the program and address information for identifying an expansion area of the program when the program is retrieved from the storage unit and expanded in the memory, the control unit determines whether the program is expanded in the memory with reference to the kernel information stored in the memory when the program is required to be executed after initialization of the control unit, and the control unit executes the program expanded in the memory by utilizing the kernel information without retrieving the program from the storage unit when the program is determined to be expanded in the memory.

2. The information processing apparatus of claim 1, wherein the control unit calculates a CRC value of the kernel information for storage in the memory when the kernel information is stored, the control unit verifies consistency or inconsistency of the kernel information stored in the memory utilizing the CRC value of the kernel information when the control unit determines whether the program is expanded in the memory, and the control unit executes the program by retrieving the program from the storage unit without executing the program expanded in the memory without regard to a result of the determination of whether the program is expanded in memory when inconsistency in the kernel information is verified.

3. The information processing apparatus of claim 1, wherein the address information at least includes code address information that indicates an address of a program code expansion area where a code of the program is expanded and data address information that indicates an address of a data expansion area where data is expanded for use at a time when the program is executed.

4. The information processing apparatus of claim 3, wherein the control unit calculates a CRC value of the code expansion area of the program;

the control unit controls the memory to further store the CRC value of the code expansion area of the program as kernel information; and the control unit executes the program by retrieving the program again from the storage unit without executing the program expanded in the memory when the CRC value of the code expansion area of the program in the memory is found to be inconsistent in a verification of consistency or inconsistency of the code expansion area, after the control unit has determined that the program is expanded in the memory.

5. The information processing apparatus of claim 3, wherein the control unit calculates a CRC value of the data expansion area of the program;

the control unit controls the memory to further store the CRC value of the data code expansion area of the program as kernel information; and the control unit executes the program by retrieving the program again from the storage unit without executing the program expanded in the memory when the CRC value of the data expansion area of the program in the memory is found to be inconsistent in a verification of consistency or inconsistency of the data expansion area, after the control unit has determined that the program is expanded in the memory.

6. A control program retrievably stored in a memory and executed by a control unit for controlling an information processing apparatus as a navigation system that has a memory to store information, a storage unit to store a program, the control unit controlling expansion and execution of the program in the memory at a location with an address determined by a function of an operating system, the control program comprising:

controlling the memory to store kernel information in the memory, the kernel information including program identification information for identifying the program and address information for identifying an expansion area of the program when the program is retrieved from the storage unit and expanded in the memory by the function of the operating system, determining whether the program is expanded in the memory with reference to the kernel information stored in the memory prior to retrieval of the program from the storage unit by the operating system when the program is required to be executed after initialization of the control unit, and when it is determined that the program is expanded in the memory, controlling the operating system to execute the program expanded in the memory by passing the kernel information to the operating system and preventing the operating system from retrieving the program from the storage unit.

7. The control program of claim 6, wherein the control program calculates a CRC value of the kernel information for storage in the memory when the kernel information is stored, the control program verifies consistency or inconsistency of the kernel information stored in the memory by utilizing the CRC value of the kernel information when the control unit determines whether the program is expanded in the memory, and the control program controls the operating system to execute the program by retrieving the program from the storage unit without allowing the operating system to execute the program that is expanded in the memory without regard to a result of the determination of whether the program is expanded in memory when inconsistency in the kernel information is verified.

8. The control program of claim 6, wherein the address information at least includes code address information that indicates an address of a program code expansion area where a code of the program is expanded and data address information that indicates an address of a data expansion area where data is expanded for use at a time when the program is executed.

9. The control program of claim 8, wherein the control program calculates a CRC value of the code expansion area of the program;

the control program controls the memory to further store the CRC value of the code expansion area of the program as kernel information; and the control program controls the operating system to execute the program by retrieving the program again from the storage unit without allowing an execution of the program expanded in the memory when the CRC value of the code expansion area of the program in the memory is found to be inconsistent in a verification of consistency or inconsistency of the code expansion area, after the control program has affirmatively determined that the program is expanded in memory.

10. The control program of claim 8, wherein
the control program calculates a CRC value of the data expansion area of the program;
the control program controls the memory to further store the CRC value of the data expansion area of the program as kernel information; and
the control program controls the operating system to execute the program by retrieving the program again from the storage unit without allowing the operating system to execute the program expanded in the memory when the CRC value of the data expansion area of the program in the memory is found to be inconsistent in a verification of consistency or inconsistency of the data expansion area, after the control program has affirmatively determined that the program is expanded in memory.

11. A control unit in a navigation device comprising:
a random-access memory (RAM) that stores data;
a read-only memory (ROM) that stores an application program; and
a central processing unit (CPU) that operates an operating system (OS), and controls expansion and execution of the application program in the ROM at a location with an address determined by an OS function, wherein
when the application program is retrieved from the ROM for a first execution, the CPU causes kernel information identifying the application program and address information identifying an expansion area in the RAM to be stored in a kernel information table stored in the RAM;
upon any subsequent execution of the application program, the CPU determines whether the application program is then expanded in the RAM with reference to kernel information stored in the kernel information table, and in any subsequent execution when the application program is determined to be then expanded, the CPU executes the application program expanded in the RAM based on the kernel information rather than retrieving the application program from the ROM.

\* \* \* \* \*